J. M. KERR.
SHOCK ABSORBER.
APPLICATION FILED MAR. 11, 1922.
1,419,631.
Patented June 13, 1922.
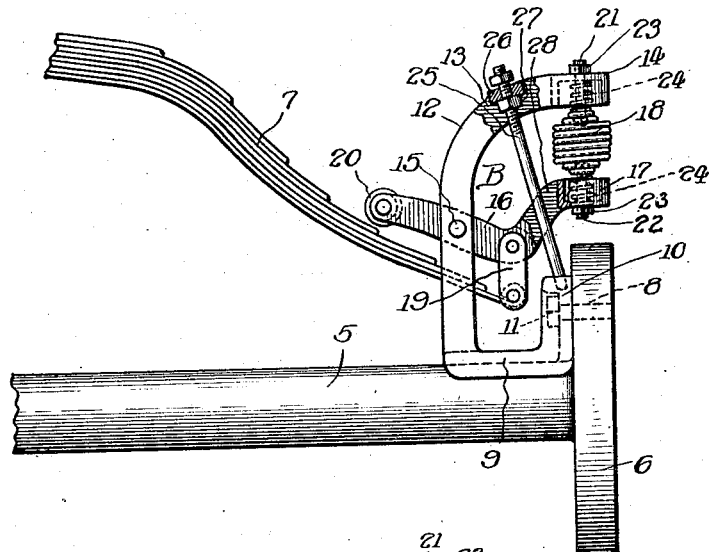
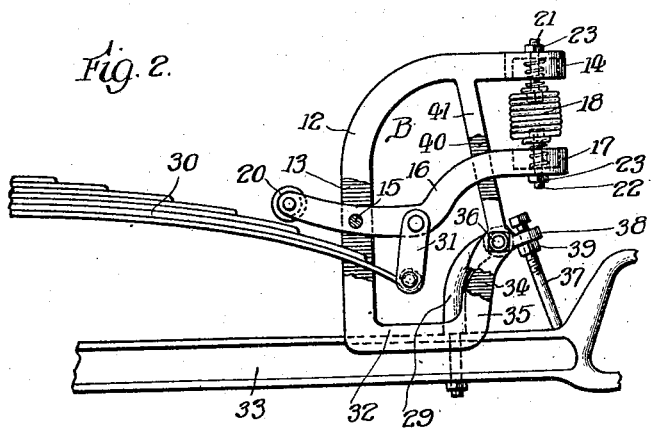
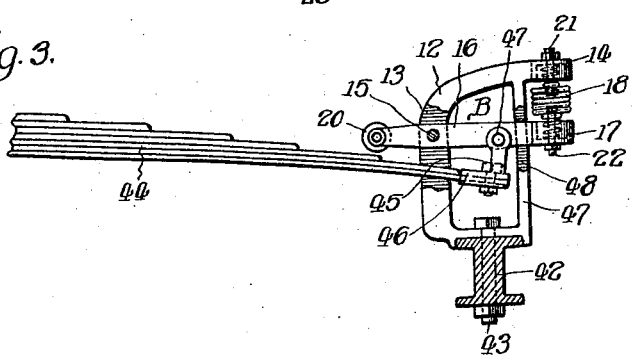
Witness:
A. J. Sauser.
Inventor:
James M. Kerr,
By Charles J. Schmidt
Atty.

UNITED STATES PATENT OFFICE.

JAMES M. KERR, OF CRAWFORDSVILLE, INDIANA.

SHOCK ABSORBER.

1,419,631.   Specification of Letters Patent.   Patented June 13, 1922.

Application filed March 11, 1922.   Serial No. 542,863.

*To all whom it may concern:*

Be it known that I, JAMES M. KERR, a citizen of the United States, and a resident of Crawfordsville, in the county of Montgomery and State of Indiana, have invented certain new and useful Improvements in Shock Absorbers, of which the following is a specification.

My invention relates to improved shock absorber mechanism which is particularly adaptable and efficient when interposed between a vehicle axle and the end of the vehicle spring, as for example in cars of the Ford or Chevrolet type.

My improved construction and its application is clearly illustrated on the accompanying drawing, in which Fig. 1 is a rear elevational view at one side of a Ford car showing the shock absorber mechanism attached, Fig. 2 is an elevational view at the front of a Ford car at one side thereof showing the application of the shock absorber mechanism, and Fig. 3 shows the application of the shock absorber mechanism on a car of the Chevrolet type.

In Fig. 1, 5 represents the rear axle housing of a Ford car and 6 the brake housing at one end of the axle housing. The rear vehicle spring is indicated by 7, and in Ford cars as primarily arranged the end of the vehicle spring is hung by a shackle from a suitable bracket (not shown) supported from the brake housing. When my shock absorber mechanism is applied this bracket support is removed and the shackle is used as part of the shock absorber mechanism. The brake housing 6 has the threaded hole or holes 8 through which the perch or bracket (not shown) is originally secured for supporting the vehicle spring. After removing the perch I use these holes for supporting my shock absorbing mechanism. This mechanism comprises a bracket structure B which has a flanged base 9 for intimately receiving on the axle housing adjacent the brake housing and which has the vertical extension 10 abutting against the brake housing and secured thereto by bolts or screws 11 engaging in the holes 8. Rising upwardly from the inner end of the base are the spaced apart arms 12 and 13 which curve outwardly at their upper ends and terminate in the head 14. The end of the vehicle spring 7 extends between the arms, and above the spring the arms support the pin 15 on which is fulcrumed the shock absorber lever 16. This lever terminates at its outer end in the head 17 which is vertically below the head 14 of the bracket, and between the heads is the shock absorber extension spring 18. Between the head and fulcrum point of the lever the shackle 19 is hung which is pivoted to the outer end of the spring. This shackle may be the one which originally suspended the spring from the perch which was secured to the brake housing. At its inner end the lever journals a roller 20 which is preferably of resilient material such as rubber.

The shock absorbing spring 18 is shown secured to the heads of bolts 21 and 22 which extend through the heads to be engaged by nuts 23 and by means of these nuts adjustment may be made for proper tension of the spring. To prevent rattling of the spring and loosening of the nuts when the spring is relaxed or during travel of the vehicle I preferably interpose spring washers 24 between the heads and the spring ends. As the shock absorbing spring functions it rerists swinging of the lever 16 and to strengthen the supporting arms 12 and 13 I insert a brace 25 which, as shown in Fig. 1 may be in the form of a rod extended through the cross piece 26 between the arms and abutting at its lower end in the part 10 of the bracket structure, a lock nut 27 holding the rod in position. To prevent interference of the rod with swing of the lever 16 the lever is provided with the passageway 28 through which the rod extends.

In Fig. 2 is shown the arrangement at the front axle of the vehicle. The bracket structure B and the shock absorber lever and shock absorber spring are practically of the same construction and arrangement as that shown in Fig. 1. However, instead of supporting the bracket against the brake housing it is supported and secured to the perch 29 from which the front vehicle spring 30 is originally suspended by the shackle member 31. When my shock absorber mechanism is to be applied the shackle is removed from the perch and the perch is turned 180 degrees as shown. The flange base 32 of the bracket structure intimately receives the axle 33. The perch is received between the spaced apart arms 34 and 35 at the inner end of the base 32, the bolt 36 extending through the arm ends and the perch end. To more securely hold the bracket structure to the axle a brace rod 37 is provided which threads through the lug 38 at the end of the arms 34 and 35 and is locked in place by the lock nut 39, the brace abutting at its lower end against the top of the axle, such abutment holding the base of the bracket member securely against the axle. Also to strengthen the upper end of the bracket structure the braces 40 and 41 extend between the ends of the arms 34 and 35 and the upper arm of the bracket member, the outer end of the lever 16 extending between the braces. Interposed between the outer end of the lever 16 and the bracket structure in the same manner as shown in Fig. 1 is the shock absorber spring 18.

In Fig. 3 I show my improved shock absorber mechanism applied to an automobile of the Chevrolet type. Here the bracket structure B is seated on the axle 42 and secured by the bolt 43 which originally secures the end of the vehicle side spring 14 to the axle. Between the arms 12 and 13 of the bracket extends the shock absorber lever 16 fulcrumed on the pin 15. At the outer end of the lever is the head 17 below the head 14 of the bracket structure and between the heads is the shock absorbing spring 18 arranged in the same manner as shown in Fig. 1. Secured to the end of the spring 44 by the bolt 45 is the perch fitting 46 which receives the pin 47 extending through the lever 16 between the head 17 and fulcrum pin 15. To strengthen the upper end of the bracket structure the braces 47 and 48 extend between the outer end of the bracket base and the top of the bracket, the shock absorber lever 16 extending between the braces. At the inner end of the lever 16 is the rubber roller 20.

Describing now the operation, when the body and axle approach, as when the wheel encounters an elevation in the roadway, the axle with the bracket structure thereon is raised and the shock absorber lever is carried upwardly at its fulcrum connection with the bracket. However as the lever is connected at its outer end with the vehicle spring the shock absorber lever will be swung in clockwise direction so that the shock absorber spring 18 is extended to absorb the shock and to gradually transmit the upward movement of the wheel to the vehicle spring, the vehicle spring functioning after the shock absorber spring has absorbed most of the impact shock.

When the axle and body separate, as when the wheel drops into a depression, the bracket structure is carried down with the shock absorber lever. During such separation the vehicle spring and the shock absorber spring are free to relax and the lever is swung in counter clockwise direction until the roller 20 abuts against the vehicle spring. Any further separation of the body and axle will then cause the shock absorber lever to be again rotated in clockwise direction against the expansion of the shock absorber spring which spring will retard the separation and absorb any shocks.

When the vehicle spring is under load it will be more or less flattened, but during drop of the axle the relaxed spring will tend to swing suddenly downwardly, but such movement will cause clockwise rotation of the shock absorber lever and extension of the shock absorbing spring to thereby snub the recoil of the vehicle spring.

When the wheel continues on a lower level after having dropped from a higher level the vehicle body eventually follows and may cause considerable flexure or flattening of the vehicle spring which will eventually recoil and tend to throw the body suddenly upwardly. However, the upthrow of the body is retarded and snubbed by the shock absorber mechanism. As the body travels upwardly the vehicle spring relaxes and swings down, and the spring also strikes the roller 20, the result of these actions being clockwise rotation of the shock absorber lever and extension of the shock absorber spring, the upper movement of the body being thus gradually retarded and snubbed and any shocks will be absorbed.

My improved shock absorber mechanism is simple and efficient and can be readily applied to the vehicle without changing its construction or adding parts. All that is necessary is to disconnect the end of the spring from its primary support and to substitute the shock absorber mechanism. I do not of course desire to be limited to the exact construction, arrangement and operation shown and described as changes and modifications can be made which will come within the scope of the appended claims.

Having described my invention, I claim as follows:

1. In a vehicle, the combination of the vehicle axle, a vehicle spring above the axle, a bracket secured on the axle and extending above the spring end, a lever fulcrumed on said bracket above the spring, the end of the spring being connected with said lever outside of the lever fulcrum, and an elastic member connected between the outer end of said lever and the upper end of said bracket for resisting swing of said lever.

2. In a vehicle, the combination with a vehicle axle, and a leaf spring secured at its base to the vehicle body and terminating above the axle, of a bracket seated and secured on said axle and extending upwardly above the spring end, a lever fulcrumed on said bracket above the spring, a shackle connecting the end of said spring with said lever outside of the lever fulcrum, an elastic member connecting between the outer end of said lever and said bracket, and an abutment on the inner end of said lever above said spring, approach of said spring and axle causing swing of said lever by virtue of its shackle connection with said spring, said elastic member resisting such swing of the lever, said abutment being engaged by the spring when the spring relaxes and said lever being swung by such engagement against the resistance of said elastic member.

3. In a vehicle, the combination with the vehicle axle, and the vehicle spring above the axle, of a bracket secured on said axle and extending above the spring end, a lever fulcrumed on said bracket above the spring, a shackle connecting the end of spring with said lever outside of the lever fulcrum, an elastic member connecting between the outer end of the lever and said bracket, and an abutment on the inner end of said lever, said shackle connection between the spring and lever causing swing of the lever against resistance of said elastic member when the spring and axle approach, relaxation of said spring when the spring and axle separate causing swing of said lever against resistance of said elastic member by virtue of the shackle connection, and relaxation of said spring also causing it to abut against said abutment to swing the lever likewise against the resistance of the elastic member.

4. In a vehicle, the combination with a vehicle axle, and a vehicle spring above the axle, of a bracket mounted on said axle and extending upwardly above the spring end, a lever fulcrumed on said bracket above the lever fulcrumed on said bracket above the spring, a connecting member connecting the end of said spring with said lever outside of the lever fulcrum, an elastic member connecting between the outer end of the lever and the upper end of said bracket, and an abutment roller on the inner end of said lever above the spring, said lever being rocked by virtue of its connection with the spring end when the spring and axle approach, such rocking being resisted by the elastic member, relaxation or curling of the spring during separation of the spring and axle causing said lever to be rocked by virtue of its connection with the spring end and also by virtue of engagement of the spring with said abutment roller, such rocking being likewise resisted by said elastic member.

5. In a vehicle, the combination with the vehicle axle, and the vehicle spring above the axle, of a supporting base secured on said axle, an arm extending upwardly from said base and outwardly at its top, a lever fulcrumed on said arm above the spring, a connection between the spring and the lever outside of the lever fulcrum, an elastic member connecting between the outer end of said lever and the outer end of said bracket arm, and a brace member for said bracket connecting with the outer end of said arm.

In witness whereof, I hereunto subscribe my name this 7th day of March, A. D. 1922.

JAMES M. KERR.